United States Patent
Donovan et al.

(10) Patent No.: US 6,987,517 B1
(45) Date of Patent: Jan. 17, 2006

(54) PROGRAMMABLE GRAPHICS PROCESSOR FOR GENERALIZED TEXTURING

(75) Inventors: Walter E. Donovan, Saratoga, CA (US); John Erik Lindholm, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 10/752,192

(22) Filed: Jan. 6, 2004

(51) Int. Cl.
*G09G 5/00* (2006.01)

(52) U.S. Cl. .................................... 345/582; 345/552

(58) Field of Classification Search ................ 345/419, 345/582, 587, 501, 503, 506, 552
See application file for complete search history.

(56) References Cited

U.S. PATENT DOCUMENTS

| | | | |
|---|---|---|---|
| 6,105,127 A * | 8/2000 | Kimura et al. .............. | 712/215 |
| 6,417,860 B1 * | 7/2002 | Migdal et al. .............. | 345/582 |
| 6,664,971 B1 * | 12/2003 | Mukherjee et al. .......... | 345/582 |
| 6,683,615 B1 * | 1/2004 | Baldwin ...................... | 345/543 |
| 6,747,642 B1 * | 6/2004 | Yasumoto .................... | 345/419 |
| 2003/0164823 A1 * | 9/2003 | Baldwin et al. ............ | 345/419 |
| 2004/0012597 A1 * | 1/2004 | Zatz et al. .................. | 345/501 |

* cited by examiner

*Primary Examiner*—Matthew Luu
(74) *Attorney, Agent, or Firm*—Patterson & Sheridan, L.L.P.

(57) ABSTRACT

A programmable graphics processor including an execution pipeline and a texture unit is described. The execution pipeline processes graphics data as specified by a fragment program. The fragment program may include one or more opcodes. The texture unit includes one or more sub-units which execute the opcodes to perform specific operations such as an LOD computation, generation of sample locations used to read texture map data, and address computation based on the sample locations.

20 Claims, 17 Drawing Sheets

PROGRAMMABLE GRAPHICS PROCESSOR FOR GENERALIZED TEXTURING

FIELD OF THE INVENTION

One or more aspects of the invention generally relate to graphics data processing, and more particularly to processing texture data in a programmable graphics processor.

BACKGROUND

Current graphics data processing includes systems and methods developed to perform a specific operation on graphics data, e.g., linear interpolation, tessellation, rasterization, texture mapping, depth testing, etc. More recently, portions of graphics processors are programmable, supporting a wider variety of operations for processing vertex data and fragment data. However, these graphics processors also include several fixed function computation units to perform specific operations, particularly for performing texture mapping operations, such as level of detail (LOD) computations, determination of addresses used to read texture data, and filtering. The fixed function computation units for performing texture mapping are configured in a pipeline that is dedicated to performing the texture mapping operations specified by texture map instructions. When texture map instructions are not used to process graphics data, the pipeline is idle. Likewise, when many texture map instructions are executed to perform texture mapping operations, a bottleneck may develop in the pipeline, thereby limiting performance.

Accordingly, it would be desirable to provide improved approaches to performing texture operations to better utilize one or more processing units within a graphics processor.

SUMMARY

The current invention involves new systems and methods for allowing flexibility in performing texture operations using a graphics processor. The flexibility enables texture operations to be performed in a fixed function unit or in a programmable graphics data processing unit to offload either the fixed function unit or the programmable graphics data processing unit as needed to improve texture operation performance.

Various embodiments of the invention include a graphics processor for processing graphics data. The graphics processor includes a texture unit coupled to a programmable execution pipeline. The texture unit includes a load unit configured to receive address data, read data corresponding to a region from memory, and produce processed graphics data. The programmable execution pipeline includes at least one multithreaded processing unit configured to process the graphics data and the processed graphics data.

Various embodiments of a method of the invention include a method of processing fragment data in a programmable graphics processing pipeline. The method includes configuring fixed function units with opcodes to perform at least one texture operation on a first portion of graphics data, processing the first portion of the graphics data to produce processed graphics data, configuring at least one of the fixed function units with an opcode to output the processed graphics data to a storage resource, and processing a second portion of the graphics data and the processed graphics data in an execution pipeline to produce fragment data.

BRIEF DESCRIPTION OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
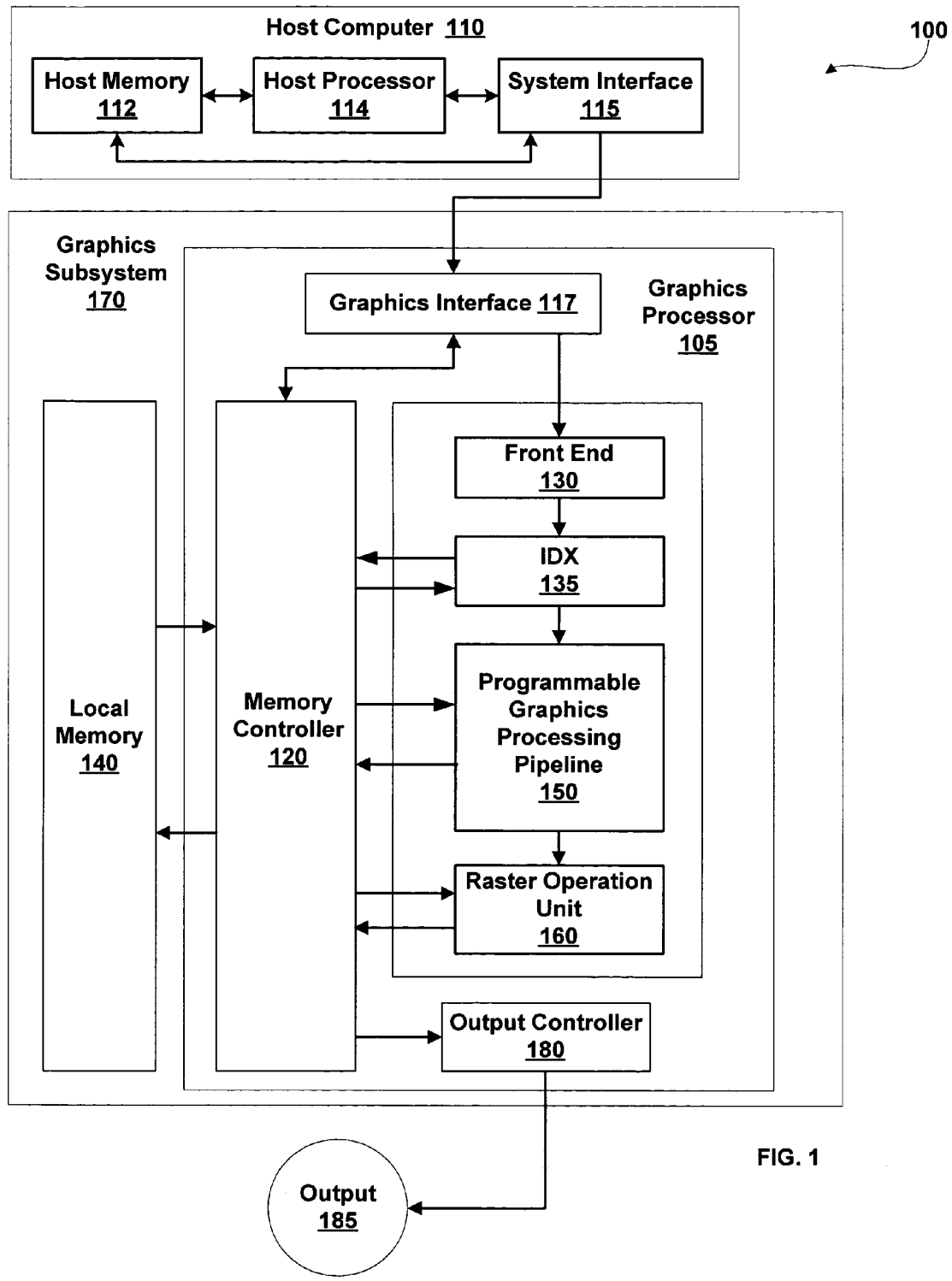
FIG. 1 is a block diagram of an exemplary embodiment of a respective computer system in accordance with one or more aspects of the present invention including a host computer and a graphics subsystem.

FIG. 1 is an illustration of a Computing System generally designated 100 and including a Host Computer 110 and a Graphics Subsystem 170. Computing System 100 may be a desktop computer, server, laptop computer, palm-sized computer, tablet computer, game console, cellular telephone, computer based simulator, or the like. Host Computer 110 includes Host Processor 114 that may include a system memory controller to interface directly to Host Memory 112 or may communicate with Host Memory 112 through a System Interface 115. System Interface 115 may be an I/O (input/output) interface or a bridge device including the system memory controller to interface directly to Host Memory 112. Examples of System Interface 115 known in the art include Intel® Northbridge and Intel® Southbridge.

Host Computer 110 communicates with Graphics Subsystem 170 via System Interface 115 and a Graphics Interface 117 within a Graphics Processor 105. Data received at Graphics Interface 117 can be passed to a Front End 130 or written to a Local Memory 140 through Memory Controller 120. Graphics Processor 105 uses graphics memory to store graphics data and program instructions, where graphics data is any data that is input to or output from components within the graphics processor. Graphics memory may include portions of Host Memory 112, Local Memory 140, register files coupled to the components within Graphics Processor 105, and the like.

Graphics Processor 105 includes, among other components, Front End 130 that receives commands from Host Computer 110 via Graphics Interface 117. Front End 130 interprets and formats the commands and outputs the formatted commands and data to an IDX (Index Processor) 135. Some of the formatted commands are used by Programmable Graphics Processing Pipeline 150 to initiate processing of data by providing the location of program instructions or graphics data stored in memory. IDX 135, Programmable Graphics Processing Pipeline 150 and a Raster Operation Unit 160 each include an interface to Memory Controller 120 through which program instructions and data can be read from memory, e.g., any combination of Local Memory 140 and Host Memory 112. When a portion of Host Memory 112 is used to store program instructions and data, the portion of Host Memory 112 can be uncached so as to increase performance of access by Graphics Processor 105.

IDX 135 optionally reads processed data, e.g., data written by Raster Operation Unit 160, from memory and outputs the data, processed data and formatted commands to Programmable Graphics Processing Pipeline 150. Programmable Graphics Processing Pipeline 150 and Raster Operation Unit 160 each contain one or more programmable processing units to perform a variety of specialized functions. Some of these functions are table lookup, scalar and vector addition, multiplication, division, coordinate-system mapping, calculation of vector normals, tessellation, calculation of derivatives, interpolation, and the like. Programmable Graphics Processing Pipeline 150 and Raster Operation Unit 160 are each optionally configured such that data processing operations are performed in multiple passes through those units or in multiple passes within Programmable Graphics Processing Pipeline 150. Programmable Graphics Processing Pipeline 150 and a Raster Operation Unit 160 also each include a write interface to Memory Controller 120 through which data can be written to memory.

In a typical implementation Programmable Graphics Processing Pipeline 150 performs geometry computations, rasterization, and fragment computations. Therefore Programmable Graphics Processing Pipeline 150 is programmed to operate on surface, primitive, vertex, fragment, pixel, sample or any other data. For simplicity, the remainder of this description will use the term "samples" to refer to graphics data such as surfaces, primitives, vertices, pixels, fragments, or the like.

Samples output by Programmable Graphics Processing Pipeline 150 are passed to a Raster Operation Unit 160, which optionally performs near and far plane clipping and raster operations, such as stencil, z test, and the like, and saves the results or the samples output by Programmable Graphics Processing Pipeline 150 in Local Memory 140. When the data received by Graphics Subsystem 170 has been completely processed by Graphics Processor 105, an Output 185 of Graphics Subsystem 170 is provided using an Output Controller 180. Output Controller 180 is optionally configured to deliver data to a display device, network, electronic control system, other computing system such as Computing System 100, other Graphics Subsystem 170, or the like. Alternatively, data is output to a film recording device or written to a peripheral device, e.g., disk drive, tape, compact disk, or the like.

Figure 2:
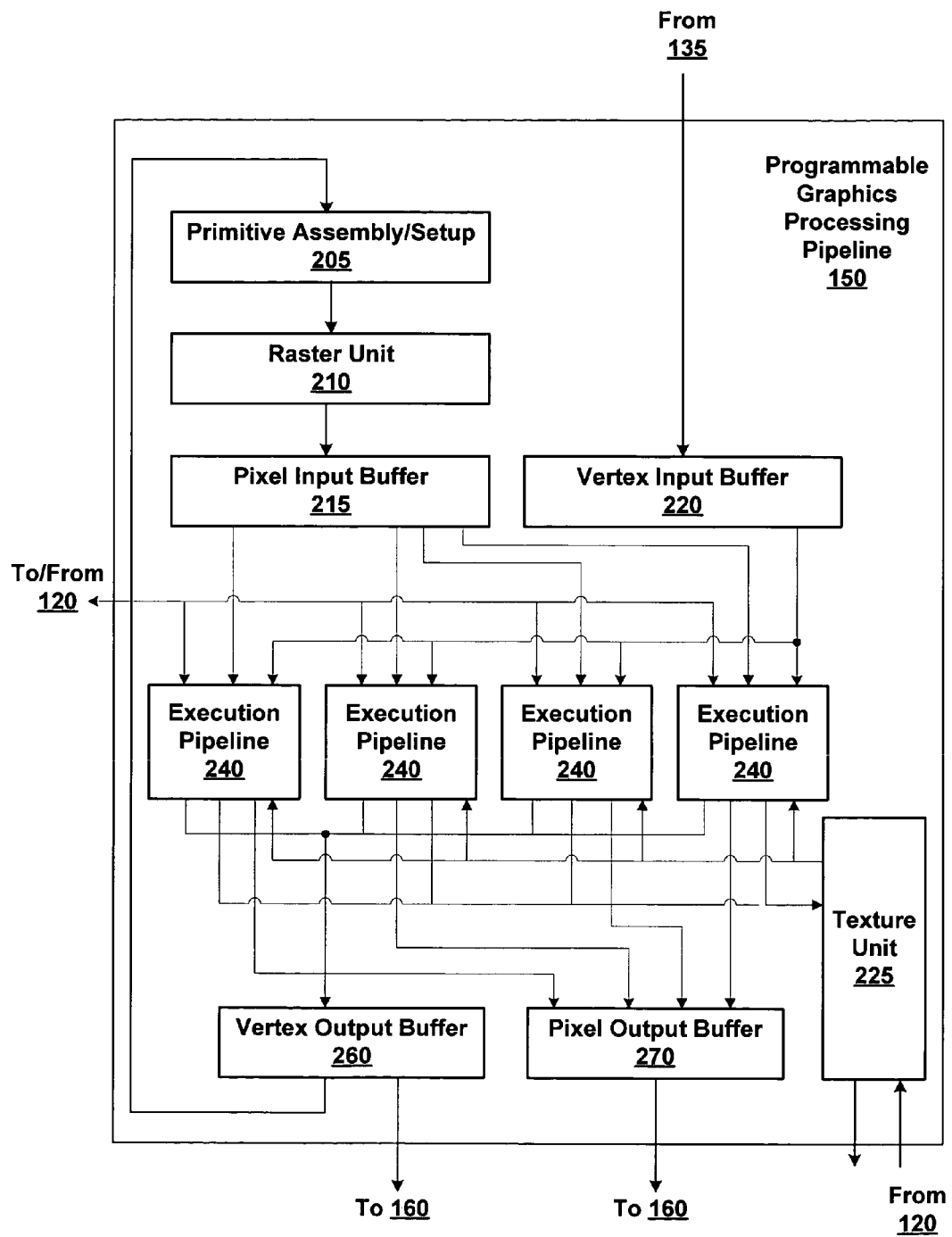
FIG. 2 is a block diagram of an exemplary embodiment of the Programmable Graphics Processing Pipeline of FIG. 1 in accordance with one or more aspects of the present invention.

FIG. 2 is an illustration of Programmable Graphics Processing Pipeline 150 of FIG. 1. At least one set of samples is output by IDX 135 and received by Programmable Graphics Processing Pipeline 150 and the at least one set of samples is processed according to at least one program, the at least one program including graphics program instructions. A program can process one or more sets of samples. Conversely, a set of samples can be processed by a sequence of one or more programs.

Samples, such as surfaces, primitives, or the like, are received from IDX 135 by Programmable Graphics Processing Pipeline 150 and stored in a Vertex Input Buffer 220 including a register file, FIFO (first in first out) memory, cache, or the like (not shown). The samples are broadcast to Execution Pipelines 240, four of which are shown in FIG. 2. Each Execution Pipeline 240 includes at least one multithreaded processing unit, to be described further herein. The samples output by Vertex Input Buffer 220 can be processed by any one of the Execution Pipelines 240. A sample is accepted by an Execution Pipeline 240 when a processing thread within the Execution Pipeline 240 is available, as described further herein. Each Execution Pipeline 240 signals to Vertex Input Buffer 220 when a sample can be accepted or when a sample cannot be accepted. In one embodiment Programmable Graphics Processing Pipeline 150 includes a single Execution Pipeline 240 containing one multithreaded processing unit. In an alternative embodiment, Programmable Graphics Processing Pipeline 150 includes a plurality of Execution Pipelines 240.

Execution Pipelines 240 may receive first samples, such as higher-order surface data, and tessellate the first samples to generate second samples, such as vertices. Execution Pipelines 240 may be configured by program instructions to transform the second samples from an object-based coordinate representation (object space) to an alternatively based coordinate system such as world space or normalized device coordinates (NDC) space. Each Execution Pipeline 240 communicates with Texture Unit 225 outputting graphics data and opcodes and receiving processed graphics data. The opcodes are program instructions that are executed by Texture Unit 225. The opcodes configure sub-units within Texture Unit 225 to process the graphics data, as described further herein. Texture Unit 225 uses a read interface (not shown in FIG. 2) to read graphics data such as texture maps from Local Memory 140 or Host Memory 112 via Memory Controller 120. In another alternate embodiment, a Texture Unit 225 is included in each Execution Pipeline 240. Each Execution Pipeline 240 uses a dedicated read interface to read the program instructions from Local Memory 140 or Host Memory 112 via Memory Controller 120. In an alternate embodiment, a read interface is shared between Execution Pipelines 240.

Execution Pipelines 240 output processed samples, such as vertices, that are stored in a Vertex Output Buffer 260 including a register file, FIFO memory, cache, or the like (not shown). Processed vertices output by Vertex Output Buffer 260 are received by a Primitive Assembly/Setup Unit 205. Primitive Assembly/Setup Unit 205 calculates parameters, such as deltas and slopes, to rasterize the processed vertices and outputs parameters and samples, such as vertices, to a Raster Unit 210. Raster Unit 210 performs scan conversion on samples, such as vertices, and outputs samples, such as fragments, to a Pixel Input Buffer 215. Alternatively, Raster Unit 210 resamples processed vertices and outputs additional vertices to Pixel Input Buffer 215.

Pixel Input Buffer 215 outputs the samples to each Execution Pipeline 240. Samples, such fragments, output by Pixel Input Buffer 215 are each processed by only one of the Execution Pipelines 240. Pixel Input Buffer 215 determines which one of the Execution Pipelines 240 to output each sample to depending on an output pixel position, e.g., (x,y), associated with each sample. In this manner, each sample is output to the Execution Pipeline 240 designated to process samples associated with the output pixel position. In an alternate embodiment, each sample output by Pixel Input Buffer 215 is processed by one of any available Execution Pipelines 240.

Each Execution Pipeline 240 signals to Pixel Input Buffer 215 when a sample can be accepted or when a sample cannot be accepted as described further herein. Program instructions configure programmable computation units (PCUs) within an Execution Pipeline 240 to perform operations such as tessellation, perspective correction, interpolation, shading, blending, and the like. Processed samples are output from each Execution Pipeline 240 to a Pixel Output Buffer 270. Pixel Output Buffer 270 optionally stores the processed samples in a register file, FIFO memory, cache, or the like (not shown). The processed samples are output from Pixel Output Buffer 270 to Raster Operation Unit 160.

Figure 3:
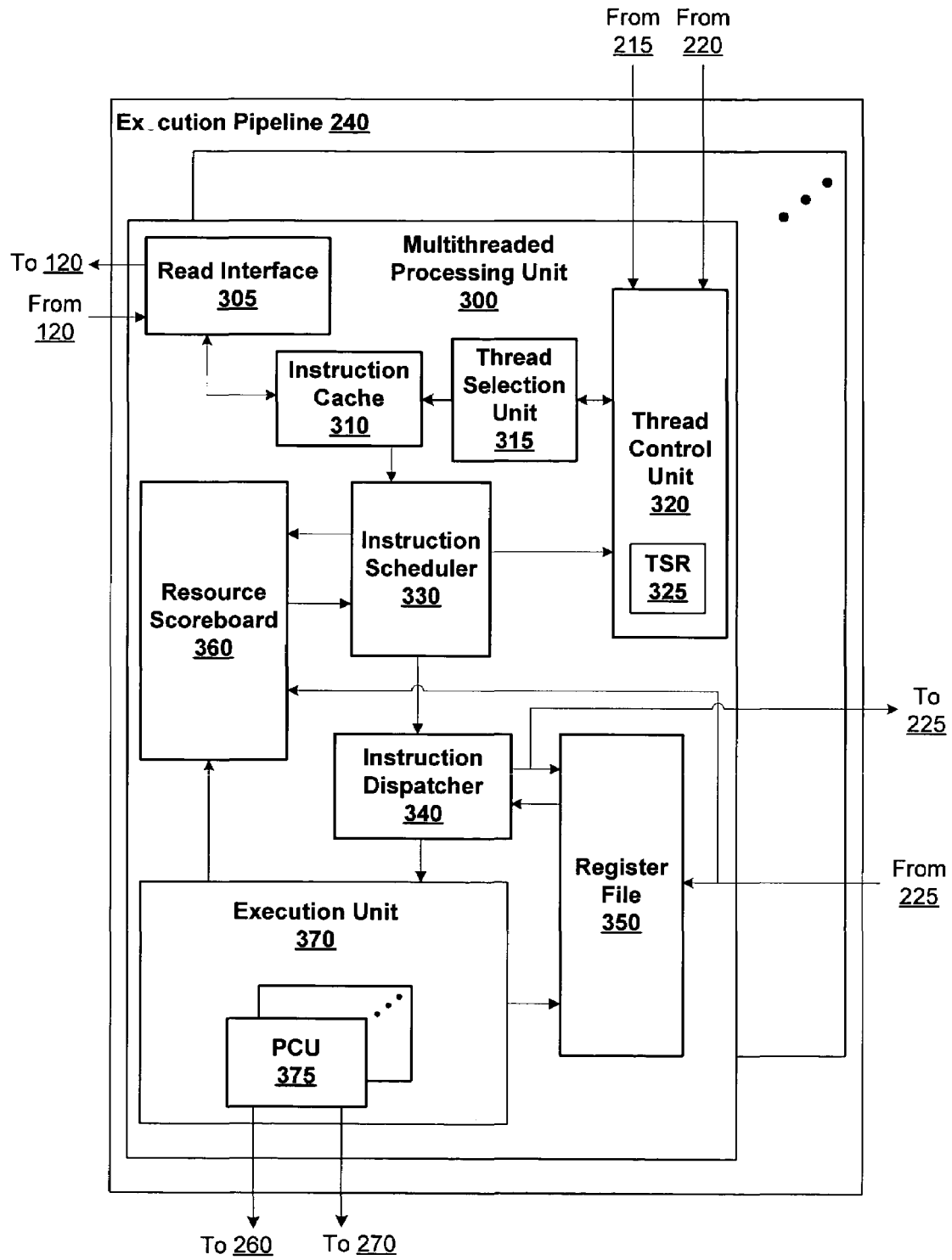
FIG. 3 is a block diagram of an exemplary embodiment of the Execution Pipeline of FIG. 1 in accordance with one or more aspects of the present invention.

FIG. 3 is an illustration of an exemplary embodiment of Execution Pipeline 240 containing at least one Multithreaded Processing Unit 300 in accordance with one or more aspects of the present invention. An Execution Pipeline 240 can contain a plurality of Multithreaded Processing Units 300, each Multithreaded Processing Unit 300 containing an Execution Unit 370. Each Execution unit 370 includes at least one PCU 375. PCUs 375 are configured using program instructions read by a Thread Control Unit 320 via a dedicated Read Interface 205. In an alternate embodiment Read Interface 205 is shared between two or more Multithreaded Processing Units 300. Thread Control Unit 320 gathers source data specified by the program instructions and dispatches the source data and program instructions to at least one PCU 375. PCUs 375 perform computations specified by the program instructions and outputs data to at least one destination, e.g., Pixel Output Buffer 270, Vertex Output Buffer 260 or Register File 350.

A single program may be used to process several sets of samples. Thread Control Unit 320 receives samples or pointers to samples stored in Pixel Input Buffer 215 and Vertex Input Buffer 220. Thread Control Unit 320 receives a pointer to a program to process one or more samples. Thread Control Unit 320 assigns a thread to each sample to be processed. A thread includes a pointer to a program instruction (program counter), such as the first instruction within the program, thread state information, and storage resources for storing intermediate data generated during processing of the sample. Thread state information is stored in a TSR (Thread Storage Resource) 325. TSR 325 may be a register file, FIFO memory, circular buffer, or the like. When all of the entries in TSR 325 storing thread state information are assigned to process samples, Execution Pipeline 240 will not accept additional samples from Pixel Input Buffer 215 or Vertex Input Buffer 220 for processing.

An instruction specifies the location of source data needed to execute the instruction. Source data, such as intermediate data generated during processing of the sample is stored in a Register File 350. In addition to Register File 350, other source data may be stored in Pixel Input Buffer 215 or Vertex Input Buffer 220. In an alternate embodiment source data is stored in Local Memory 140, locations in Host Memory 112, and the like.

Thread state data for a thread may include, among other things, a program counter, a busy flag that indicates if the thread is either assigned to a sample or available to be assigned to a sample, a pointer to a source sample to be processed by the instructions associated with the thread or the output pixel position and output buffer ID of the source sample to be processed, and a pointer specifying a destination location in Vertex Output Buffer 260 or Pixel Output Buffer 270. Additionally, thread state data for a thread assigned to a sample may include the sample type, e.g., fragment, vertex, primitive, or the like. The type of data a thread processes identifies the thread type, e.g., fragment, vertex, primitive, or the like. For example, a thread may process a primitive, producing a vertex. After the vertex is rasterized and fragments are generated, the thread may process a fragment.

Source samples are stored in either Pixel Input Buffer 215 or Vertex Input Buffer 220. A thread allocation priority may be specified for each sample type and Thread Control Unit 320 may be configured to assign threads to samples or allocate locations in a Register File 350 based on the priority assigned to each sample type. The thread allocation priority may be fixed, programmable, or dynamic. Once a thread is assigned to a source sample, the thread is allocated storage resources such as locations in a Register File 350 to retain intermediate data generated during execution of program instructions associated with the thread. Alternatively, source data is stored in storage resources including Local Memory 140, locations in Host Memory 112, and the like.

A Thread Selection Unit 315 reads one or more thread entries, each containing thread state data, from Thread Control Unit 320. Thread Selection Unit 315 may read thread entries to process a group of samples. For example, in one embodiment a group of samples, e.g., a number of vertices defining a primitive, four adjacent fragments arranged in a square, or the like, are processed simultaneously. In the one embodiment computed values such as derivatives are shared within the group of samples thereby reducing the number of computations needed to process the group of samples compared with processing the group of samples without sharing the computed values.

In Multithreaded Processing Unit 300, a thread execution priority may be specified for each thread type and Thread Selection Unit 315 may be configured to read thread entries based on the thread execution priority assigned to each thread type. A thread execution priority may be fixed, programmable, or dynamic. In one embodiment the thread execution priority may be fixed, always giving priority to execution of vertex threads and pixel threads are only executed if vertex threads are not available for execution. In another embodiment, Thread Selection Unit 315 is configured to read thread entries based on the amount of sample data in Pixel Input Buffer 215 and the amount of sample data in Vertex Input Buffer 220. Specifically, the thread execution priority may be tuned such that the number of pending pixels produced by processing vertex threads is adequate to achieve maximum utilization of the computation resources in Execution Pipelines 240 processing pixel threads.

Thread Selection Unit 315 reads one or more thread entries and outputs selected thread entries to Instruction Cache 310. Instruction Cache 310 determines if the program instructions corresponding to the program counters and sample type included in the thread state data for each thread entry are available in Instruction Cache 310. When a requested program instruction is not available in Instruction Cache 310 it is read (possibly along with other program instructions stored in adjacent memory locations) from graphics memory. A base address, corresponding to the graphics memory location where a first instruction in a program is stored, may be used in conjunction with a program counter to determine the location in graphics memory where a program instruction corresponding to the program counter is stored. In an alternate embodiment, Instruction Cache 310 can be shared between Multithreaded Processing Units 300 within Execution Pipeline 240.

The program instructions corresponding to the program counters from the one or more thread entries are output by Instruction Cache 310 to a scheduler, Instruction Scheduler 330. The number of instructions output each clock cycle from Instruction Cache 310 to Instruction Scheduler 330 can vary depending on whether or not the instructions are available in the cache. The number of instructions that can be output each clock cycle from Instruction Cache 310 to Instruction Scheduler 330 may also vary between different embodiments. In one embodiment, Instruction Cache 310 outputs one instruction per clock cycle to Instruction Scheduler 330. In an alternate embodiment, Instruction Cache 310 outputs a predetermined number of instructions per clock cycle to Instruction Scheduler 330.

Instruction Scheduler 330 contains storage resources to store a predetermined number of instructions. Each clock cycle, Instruction Scheduler 330 evaluates whether any instruction stored within Instruction Scheduler 330 can be executed based on the availability of computation resources in an Execution Unit 370 and source data stored in Register File 350. An instruction specifies the location of source data needed to execute the instruction. In addition to Register File 350, other locations of source data include Pixel Input Buffer 215, Vertex Input Buffer 220, locations in Local Memory 140, locations in Host Memory 112, and the like. A resource tracking unit, Resource Scoreboard 360, tracks the status of source data stored in registers in Register File 350. Specifically, registers scheduled to be written during processing, i.e., destination registers, are marked as "write pending". When a destination register is written, its status is updated and the "write pending" mark is removed. In one embodiment a destination register is marked as "write pending" by setting a bit in Resource Scoreboard 360 corresponding to the destination register. The bit is cleared when the destination register is written, indicating that data stored in the register is available to be used as source data. Similarly, Resource Scoreboard 360 may also track the availability of the computation resources in an Execution Unit 370.

Instruction Scheduler 330 determines which instructions and associated threads will be executed and outputs an updated program counter to Thread Control Unit 320. Alternatively, Instruction Scheduler 330 outputs a difference value to update the program counter in Thread Control Unit 320. Instruction Scheduler 330 executes instruction which do not process data, such as jump, call/return, or branch instructions.

For execution of instructions which do process data, Instruction Scheduler 330 updates destination register status and computation resource availability in Resource Scoreboard 360 as needed, and updates each program counter in Thread Control Unit 320 associated with a thread output to Instruction Dispatcher 340 to point to the next instruction in the thread. In this manner, Instruction Scheduler 330 is able to schedule the execution of the instructions associated with each thread such that the processing of a sample is one or more instructions ahead of the processing of another sample. For example a first sample that requires source data such as texture data stored in Local Memory 140 may be idle for many cycles while the texture data is read and optionally processed by Texture Unit 225. In contrast, a second sample which does not require source data stored in Local Memory 140, may complete processing before the source data for the first sample is available.

Instruction Dispatcher 340 gathers the source data from Pixel Input Buffer 215, Vertex Input Buffer 220 or Register File 350 specified in an instruction and outputs the instruction and source data to Execution Unit 370 including at least one PCU 375. If the instruction is an opcode, Instruction Dispatcher 340 gathers the source data from Pixel Input Buffer 215, Vertex Input Buffer 220 or Register File 350 specified in the instruction and outputs the opcode and source data to Texture Unit 225. In an alternate embodiment, Instruction Dispatcher 340 also gathers the source data from Local Memory 140, Host Memory 112, or the like.

Execution Unit 370 is configured by the program instruction to simultaneously process samples using PCUs 375 to perform operations such as linear interpolation, derivative calculation, blending, and the like, and output the processed sample to a destination specified by the instruction. The destination may be Vertex Output Buffer 260, Pixel Output Buffer 270, or Register File 350. Alternatively, the destination may also include Local Memory 140, Host Memory 112, or the like. A sub-unit within Texture Unit 225 is configured by the opcode to process samples to perform operations such as LOD calculation, sample location generation, address computation, filtering, and the like. While PCUs 375 are programmable and may process data using 32-bit floating-point precision, sub-units within Texture Unit 225 may be configured to perform a specific set of operations, processing data using more limited precision, such as fixed-point precision or 16-bit floating-point precision.

When execution of an instruction is complete, Execution Unit 370 updates Resource Scoreboard 360 to indicate that destination registers are written. When execution of an opcode is complete, Texture Unit 225 updates Resource Scoreboard 360 to indicate that destination registers are written. In an alternate embodiment, Resource Scoreboard 360 snoops interfaces between Execution Unit 370 and Register File 350 and Texture Unit 225 and Register File 350 to update register status.

When the program instructions associated with a thread have completed execution, the storage resources allocated to retain intermediate data generated during execution of the thread become available for allocation to another thread, i.e., the storage resources are deallocated and the thread is flagged as available in Thread Control Unit 320. When a program instruction stored in Instruction Cache 310 has completed execution on each sample within the one or more sets that the program instruction is programmed to process, the program instruction is retired from Instruction Cache 310 (by being overwritten).

In conventional embodiments of Texture when a fragment program does not include opcodes, Texture Unit 225 is idle, and floating-point computational resources within Filter Unit 450 are unused. When opcodes that are specific for each sub-unit within Texture Unit 225 are used it is possible to decouple the sub-units so that one or more sub-units may be used to process graphics data when the opcodes corresponding to those sub-units are included in the fragment program. FIG. 4C is a block diagram of an exemplary embodiment of Texture Unit 225 in accordance with one or more aspects of the present invention in which the sub-units are decoupled from each other.

Figure 4A:
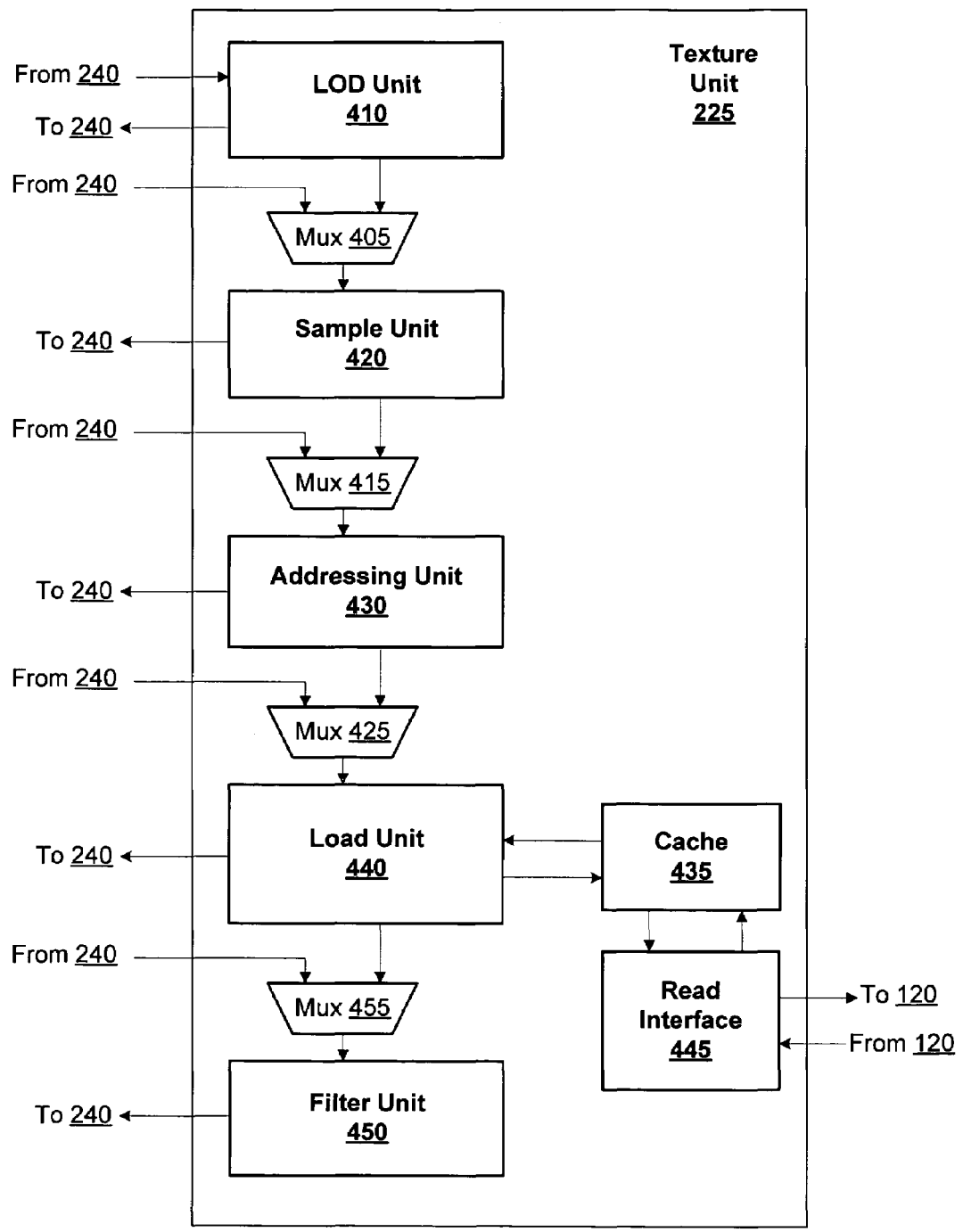
FIG. 4A is a block diagram of an exemplary embodiment of the Texture Unit of FIG. 2 in accordance with one or more aspects of the present invention.

FIG. 4A is a block diagram of an exemplary embodiment of Texture Unit 225 in accordance with one or more aspects of the present invention. Texture Unit 225 includes several sub-units, specifically an LOD Unit 410, a Sample Unit 420, an Addressing Unit 430, a Load Unit 440, a Cache 435, a Filter Unit 450, and a Read Interface 445. Each of the sub-units within Texture Unit 225 is a fixed function unit that is configured to perform texture operations using one or more opcodes. In one embodiment any one of the sub-units receives one or more opcodes and graphics data from any of the Execution Pipelines 240 and any one of the sub-units outputs processed graphics data to Execution Pipelines 240. Specifically, any sub-unit within Texture Unit 225 may output processed data to Register File 350 within a Multi-threaded Processing Unit 300. In alternate embodiment each of the sub-units may receive one or more opcodes from any of the Execution Pipelines 240 and each of the sub-units may output processed graphics data to Execution Pipelines 240. In such an alternate embodiment, one or more sub-units may process data received from one or more Execution Pipelines 240 and output processed graphics data to the one or more Execution Pipelines 240. Furthermore, in some embodiments an opcode specifies a subroutine to be executed by any combination of the sub-units. In other embodiments an opcode specifies an operation or subroutine to be performed by a specific sub-unit.

The graphics data received by LOD Unit 410 may include texture coordinates such as s, t, r, and q for one or more samples. LOD Unit 410 is configured by one or more LOD unit opcodes to compute projected texture coordinates and an LOD value using techniques known to those skilled in the art. LOD Unit 410 may compute a cube map side when cube mapping is used. Furthermore, LOD Unit 410 computes a normalized vector defining an axis of anisotropy using techniques known to those skilled in the art. LOD outputs LOD data, including the projected texture coordinates, an LOD value, and the normalized vector defining the axis of anisotropy, to Sample Unit 420. The LOD data may also include the cube map side. The LOD data may be output to Sample Unit 420 via a multiplexer, Mux 405, or to any of the Execution Pipelines 240, as specified by the LOD unit opcodes. LOD Unit 410 optionally receives opcodes for other sub-units and outputs those opcodes to Sample Unit 420.

Sample Unit 420 is configured by one or more sample unit opcodes to determine sample locations for reading tap data, e.g., texture data, using LOD data received from either any of the Execution Pipelines 240 or LOD Unit 410 via Mux 405. Sample Unit 420 outputs texture parameters to Addressing Unit 430 via a multiplexer, Mux 415 or to any of the Execution Pipelines 240, as specified by sample unit opcodes. Specifically, Sample Unit 420 generates additional samples along the axis of anisotropy, using a technique known to those skilled in the art. In some embodiments projected texture coordinates, the normalized vector defining the axis of anisotropy, and LOD value are represented in a floating point format. Sample Unit 420 computes fixed point texture parameters, including scaled texture coordinates u, v, and p. Sample Unit 420 also computes a fixed point mip map level based on the LOD value. In addition to the scaled texture coordinates, the texture parameters output by Sample Unit 420 include the mip map level and include the cube map side when cube mapping is used. The texture parameters are output by Sample Unit 420 to Addressing Unit 430 via Mux 415 or to any of the Execution Pipelines 240. Sample Unit 420 optionally receives opcodes for other sub-units and outputs those opcodes to Addressing Unit 430.

Addressing Unit 430 is configured by one or more addressing unit opcodes received from either any of the Execution Pipelines 240 or Sample Unit 420 via Mux 405 to determine address data. Addressing Unit 430 optionally receives opcodes for other sub-units, such as load unit opcodes, and outputs those opcodes to Load Unit 440 via Mux 425 or to any of the Execution Pipelines 240. Addressing Unit 430 converts a sample, represented by the texture parameters, into "taps" needed to filter the sample as specified by the one or more addressing unit opcodes. The address data includes addresses to read data corresponding to one or more locations according to the taps. The locations may be stored in Local Memory 140 or in Host Memory 114. Addressing Unit 430 outputs the address data and load unit opcodes to Load Unit 440 via Mux 415 or to any of the Execution Pipelines 240. In some embodiments Addressing Unit 430 is included within Load Unit 440.

Load Unit 440 is configured by one or more load unit opcodes received from either any of the Execution Pipelines 240 or Addressing Unit 430 via Mux 425 to read data, corresponding to the taps, from memory, e.g. Local Memory 140 and/or Host Memory 112, via Cache 435, Read Interface 445, and Memory Controller 120. Cache 435 is used to improve memory read performance by reducing read latency and management of Cache 435 is performed by Load Unit 440 using techniques known by those skilled in the art. In an alternate embodiment Cache 435 is omitted. Load Unit 440 reads data corresponding to a region, for example a contiguous two-dimensional region of a texture map, a contiguous area of an image, or the like. In some embodiments Load Unit 440 receives data read from memory from Cache 435. In other embodiments, embodiments in which Cache 435 is omitted, Load Unit 440 receives data read from memory from Read Interface 445. The data read from memory may include color, depth, indices, vector components, displacements, or the like. In some embodiments the data read from memory is compressed data which is decompressed within Load Unit 440 to produce tap data. Load Unit 440 outputs the data read from memory or decompressed data as tap data to Filter Unit 450 via multiplexer, Mux 455, or to any of the Execution Pipelines 240. Load Unit 440 optionally receives filter unit opcodes and outputs the filter unit opcodes to Filter Unit 450.

Filter Unit 450 is configured by one or more filter unit opcodes received from either any of the Execution Pipelines 240 or Load Unit 440 via Mux 455 to compute a digital filter on the tap data and produce processed graphics data, e.g., filtered tap data using techniques known to those skilled in the art. Filter Unit 450 outputs the filtered tap data to any Execution Pipeline 240. Filter Unit 450 also computes a weight for each tap. In some embodiments Filter Unit 450 filters tap data represented in a floating-point format using floating-point operations including, but not limited to multiplication and addition, to produce processed graphics data represented in a floating-point format.

The system shown in FIG. 4A permits configuration of a sub-unit, such as Filter Unit 450 to perform operations independent of the other sub-units in Texture Unit 225. Likewise, operations performed by one or more sub-units may instead be performed by Execution Unit 370 within a Multithreaded Processing Unit 300. In an alternate embodiment, the function performed by each of the multiplexers (Mux 405, Mux 415, Mux 425, and Mux 455) is included within the sub-units receiving data and opcodes from each of the multiplexers, and the multiplexers are omitted.

Figure 4B:
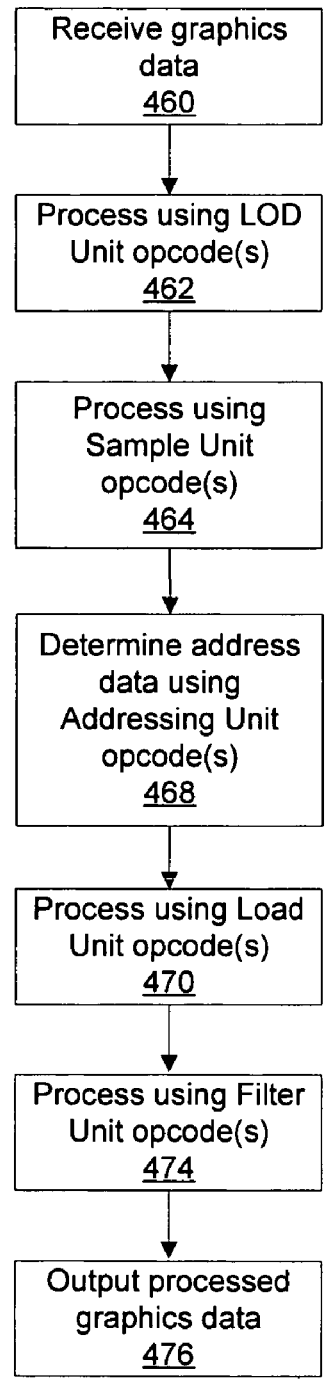
FIG. 4B illustrates an embodiment of a method of processing graphics data in accordance with one or more aspects of the present invention.

FIG. 4B illustrates an embodiment of a method of processing graphics data in accordance with one or more aspects of the present invention. Although the method steps are described in the context of the systems illustrated in FIGS. 2, 3, and 4A, any system configured to perform the method steps in any order is within the scope of the invention. Specifically, the method shown in FIG. 4B is completed by a Texture Unit 225 configured such that LOD Unit 410 receives graphics data and opcodes from an Execution Pipeline 240, Mux 405 outputs LOD data and opcodes to Sample Unit 420, Mux 415 outputs texture parameters and opcodes to Addressing Unit 430, Mux 455 outputs tap data to Filter Unit 450, and Filter Unit 450 outputs processed graphics data to the Execution Pipeline 240.

In step 460 Texture Unit 225 receives graphics data and one or more opcodes from the Execution Pipeline 240. Each opcode specifies an operation or subroutine to be performed by a specific sub-unit. In step 462 LOD Unit 410 processes the graphics data as specified by any LOD unit opcodes included in the one or more opcodes and outputs LOD data and the one or more opcodes to Sample Unit 420. In step 464 Sample Unit 420 processes the LOD data as specified by any sample unit opcodes included within the one or more opcodes and outputs texture parameters and the one or more opcodes to Addressing Unit 430. In step 468 Addressing Unit 430 determines address data as specified by any addressing unit opcodes included within the one or more opcodes and outputs the address data and the one or more opcodes to Load Unit 440. In step 470 Load Unit 440 processes the address data as specified by any load unit opcodes included within the one or more opcodes, reading tap data from memory and producing tap data. Load Unit 440 outputs the tap data and the one or more opcodes to Filter Unit 450. In step 474 Filter Unit 450 processes the tap data as specified by any filter unit opcodes included within the one or more opcodes to produce filtered tap data, e.g., processed graphics data. In step 476 Filter Unit 450 outputs the processed graphics data to the Execution Pipeline 240.

Figure 5A:
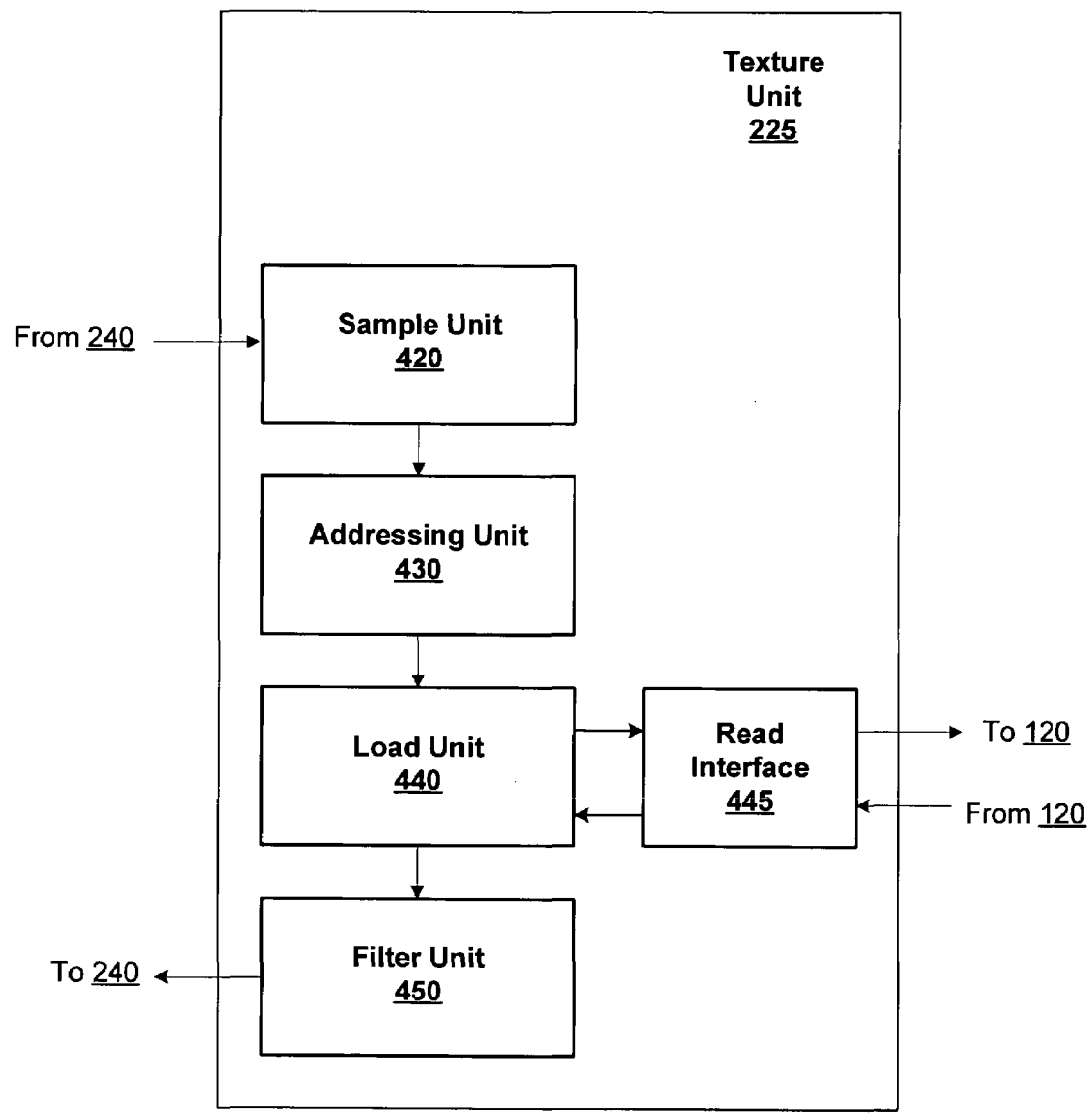
FIG. 5A is a block diagram of an exemplary embodiment of the Texture Unit of FIG. 2 in accordance with one or more aspects of the present invention.

FIG. 5A is a block diagram of an exemplary embodiment of Texture Unit 225 in accordance with one or more aspects of the present invention. LOD Unit 410 is omitted and LOD data is produced by Execution Unit 370 and output to Sample Unit 420 along with sample unit opcodes. In one embodiment, Execution Unit 370 computes an LOD value at a vertex instead of at each fragment and vertex LOD values are interpolated to produce LOD values corresponding to each fragment. A Texture Unit 225 as shown in FIG. 4A configured such that Sample Unit 420 receives LOD data and opcodes from an Execution Pipeline 240 via Mux 405, Mux 415 outputs texture parameters and opcodes to Addressing Unit 430, Mux 425 outputs address data and opcodes to Load Unit 440, Mux 455 outputs tap data to Filter Unit 450, and Filter Unit 450 outputs processed graphics data to the Execution Pipeline 240, may be used as an alternate embodiment.

Figure 5B:
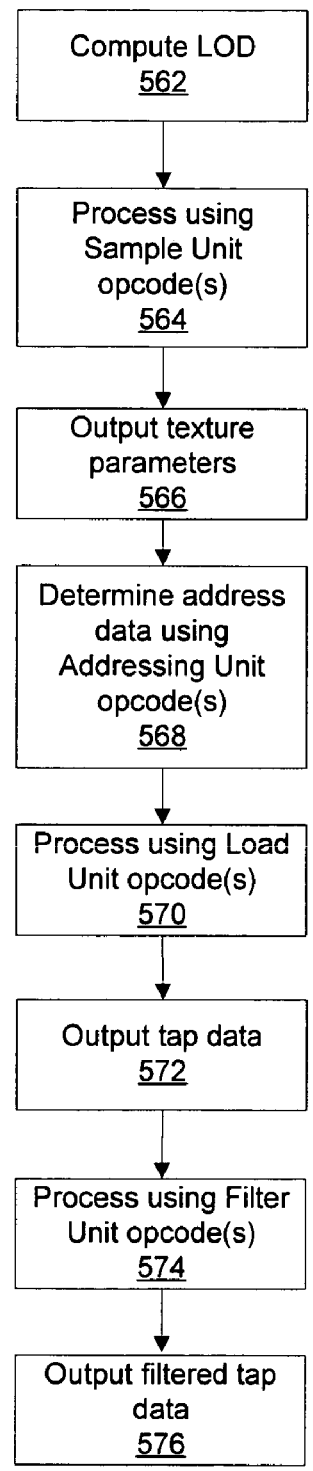
FIG. 5B illustrates an embodiment of a method of processing graphics data in accordance with one or more aspects of the present invention.

FIG. 5B illustrates an embodiment of a method of processing graphics data in accordance with one or more aspects of the present invention. Although the method steps are described in the context of the systems illustrated in FIGS. 2, 3, 4A, and 5A, any system configured to perform the method steps in any order is within the scope of the invention. In step 562 LOD data is computed by Execution Unit 370 as specified by program instructions and stored in Register File 350. The LOD data is read from Register File 350 and output by Instruction Dispatcher 340, with one or more opcodes, to Sample Unit 420. In step 564 Sample Unit 420 processes the LOD data as specified by any sample unit opcodes extracted from the one or more opcodes to produce texture parameters. In step 566 Sample Unit 420 outputs the texture parameters and any first remaining opcodes to Addressing Unit 430.

In step 568 Addressing Unit 430 receives the texture parameters and the first remaining opcodes from Instruction Dispatcher 340. Addressing Unit 430 processes the texture parameters as specified by any addressing unit opcodes extracted from the first remaining opcodes and outputs the address data and any second remaining opcodes to Load Unit 440. In step 570 Load Unit 440 processes the address data as specified by any load unit opcodes extracted from the second remaining opcodes, to produce tap data using data read from memory. Load Unit 440 outputs the tap data and any third remaining opcodes to Filter Unit 450. In step 574 Filter Unit 450 receives the tap data and the third remaining opcodes from Load Unit 440 and processes the tap data as specified by the one or more filter unit opcodes to produce filtered tap data, e.g., processed graphics data. In step 576 Filter Unit 450 outputs the processed graphics data to the Register File 350 which stored the LOD data in step 562 and Register File 350 stores the processed graphics data. In an alternate embodiment, such as the embodiment shown in FIG. 4A, Filter Unit 450 receives graphics data processed by Execution Unit 370 as specified by program instructions from Instruction Dispatcher 340 via Mux 455 and produces filtered graphics data.

Figure 6A:
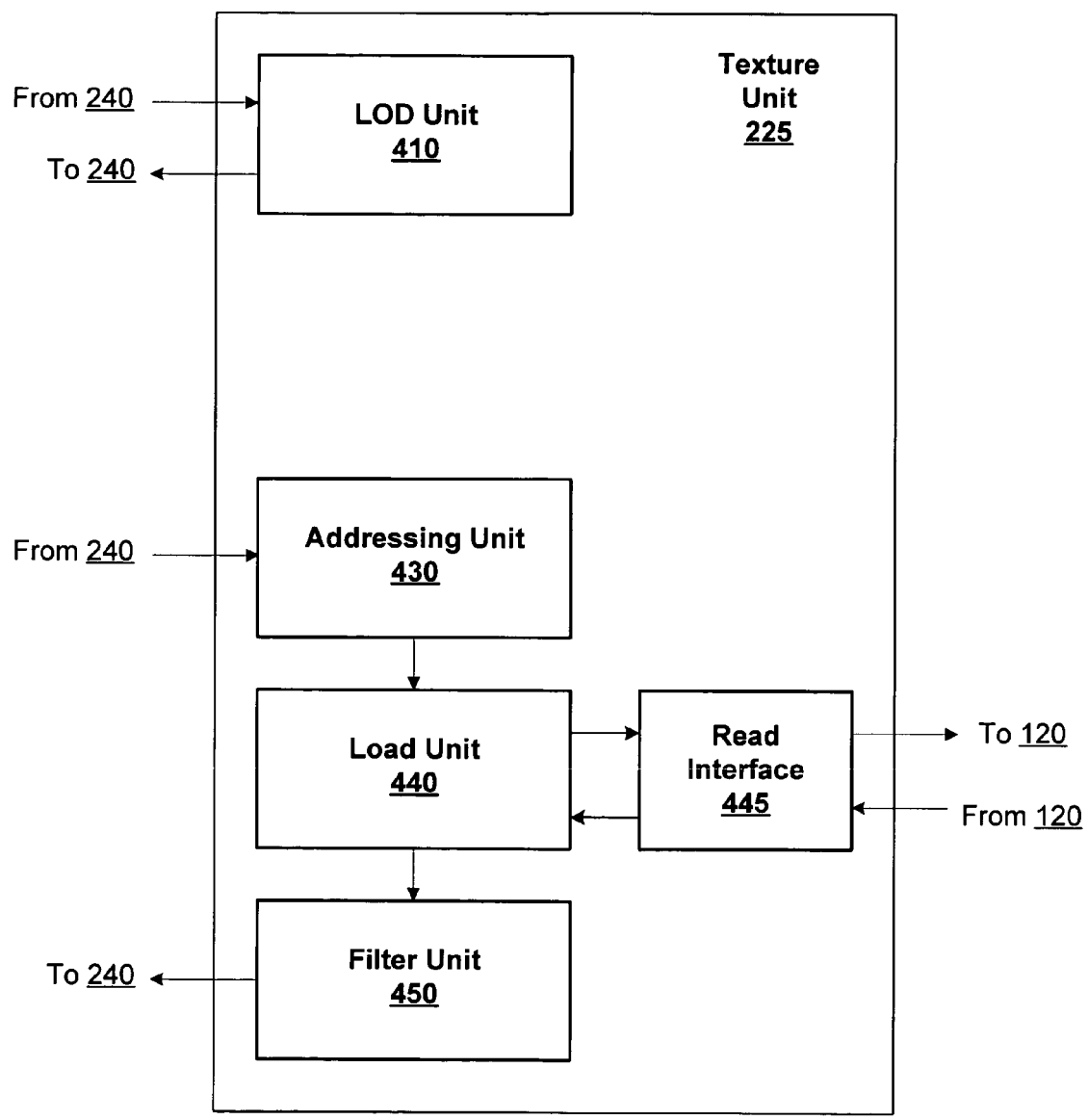
FIG. 6A is a block diagram of an exemplary embodiment of the Texture Unit of FIG. 2 in accordance with one or more aspects of the present invention.

FIG. 6A is a block diagram of an exemplary embodiment of Texture Unit 225 in accordance with one or more aspects of the present invention. Sample Unit 420 is omitted and texture parameters are produced by Execution Unit 370 and output to Addressing Unit 430 along with one or more opcodes. In one embodiment, Execution Unit 370 computes texture parameters corresponding to a volumetric or elliptical footprint. For example, to sample data represented as a volumetric texture to simulate fog. A Texture Unit 225 as shown in FIG. 4A configured such that Addressing Unit 430 receives texture parameters and opcodes from an Execution Pipeline 240 via Mux 415, Mux 425 outputs address data and opcodes to Load Unit 440, Mux 455 outputs tap data to Filter Unit 450, and Filter Unit 450 outputs processed graphics data to the Execution Pipeline 240, may be used as an alternate embodiment for at least a portion of the embodiment of Texture Unit 225 shown in FIG. 6A.

Figure 6B:
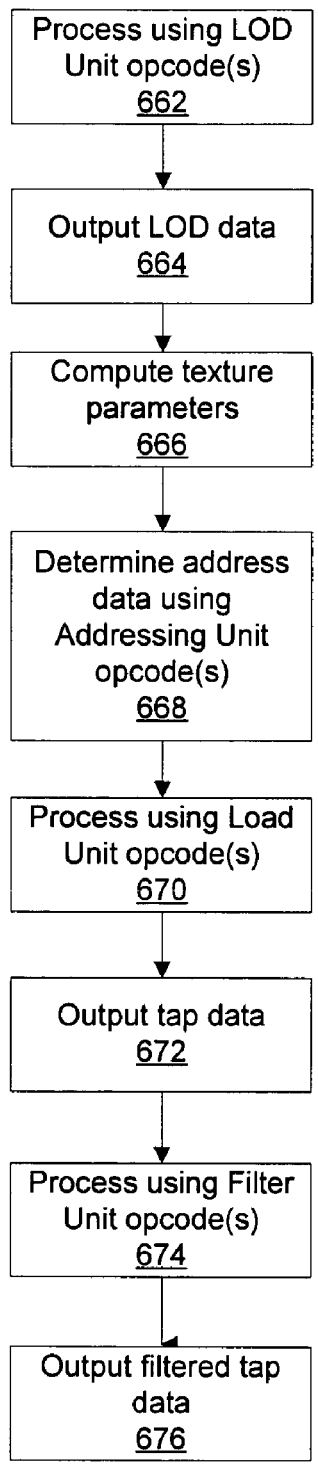
FIG. 6B illustrates an embodiment of a method of processing graphics data in accordance with one or more aspects of the present invention.

FIG. 6B illustrates an embodiment of a method of processing graphics data in accordance with one or more aspects of the present invention. Although the method steps are described in the context of the systems illustrated in FIGS. 2, 3, 4A, 5A, and 6A, any system configured to perform the method steps in any order is within the scope of the invention. In step 662 LOD Unit 410 processes graphics data as specified by one or more LOD unit opcodes to produce LOD data. In step 664 the LOD data is output by LOD Unit 410 and is stored in a Register File 350. In step 666 the LOD data is read from Register File 350 and processed by an Execution Unit 370 as specified by program instructions to produce texture parameters. The texture parameters are stored in the Register File 350 and are output by Instruction Dispatcher 340, with one or more opcodes, to Addressing Unit 430. Steps 668, 670, 672, 674, and 676 proceed as described with respect to steps 570, 572, 574, and 576 in conjunction with FIG. 5B.

Figure 7A:
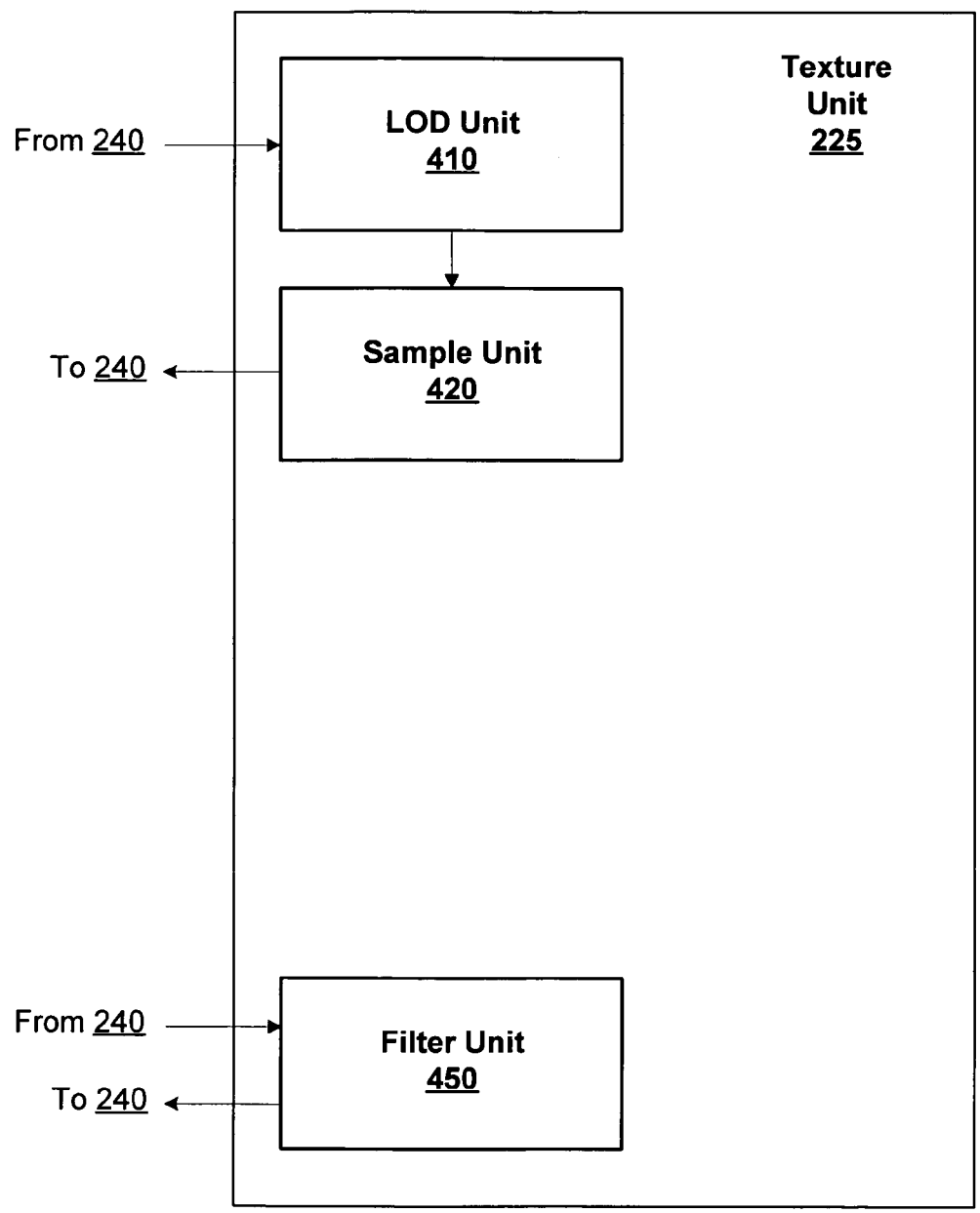
FIG. 7A is a block diagram of an exemplary embodiment of the Texture Unit of FIG. 2 in accordance with one or more aspects of the present invention.

FIG. 7A is a block diagram of an exemplary embodiment of Texture Unit 225 in accordance with one or more aspects of the present invention. Addressing Unit 430, Load Unit 440, and Read Interface 445 are omitted and tap data is produced by Execution Unit 370 and output to Filter Unit 450 along with filter unit opcodes. In one embodiment, Execution Unit 370 generates pseudorandom data based on the texture parameters. In an alternative embodiment, Load Unit 440 and Read Interface 445 are not omitted and Execution Unit 370 determines address data to perform octahedral cube mapping. A Texture Unit 225 as shown in FIG. 4A configured such that LOD Unit 410 receives graphics data and opcodes from an Execution Pipeline 240, Mux 405 outputs LOD data to Sample Unit 420, and Sample Unit 420 outputs processed graphics data to the Execution Pipeline 240, may be used as an alternate embodiment for at least a portion of the embodiment of Texture Unit 225 shown in FIG. 7A. The Texture Unit 225 as shown in FIG. 4A may be configured such that Filter Unit 450 receives tap data from the Execution Pipeline 240 via Mux 455 and outputs processed graphics data to the Execution Pipeline 240 as an alternate embodiment for another portion of the embodiment of Texture Unit 225 shown in FIG. 7A.

Figure 7B:
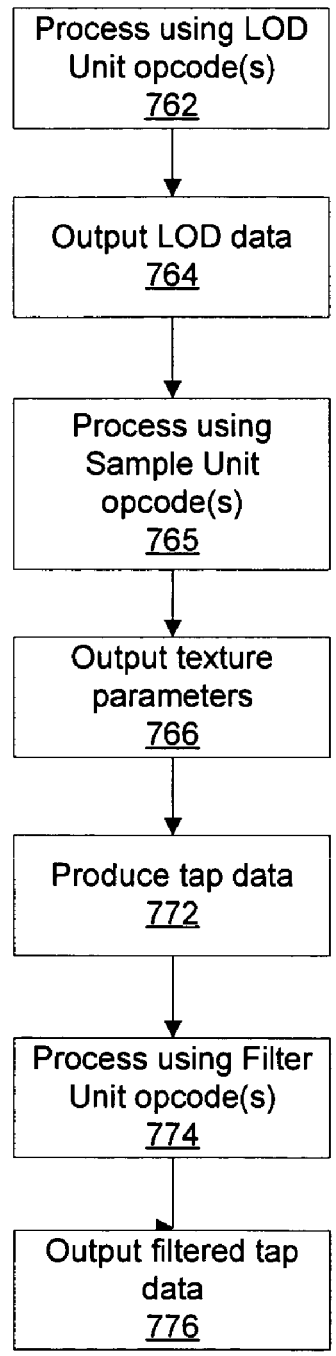
FIG. 7B illustrates an embodiment of a method of processing graphics data in accordance with one or more aspects of the present invention.

FIG. 7B illustrates an embodiment of a method of processing graphics data in accordance with one or more aspects of the present invention. Although the method steps are described in the context of the systems illustrated in FIGS. 2, 3, 4A, 5A, 6A, and 7A, any system configured to perform the method steps in any order is within the scope of the invention. Steps 762 and 764 are completed as described with respect to steps 662 and 664 in conjunction with FIG. 6B. Steps 765 and 766 are completed as described with respect to steps 564 and 566 in conjunction with FIG. 5B. In step 772 texture parameters are read from Register File 350 and processed by an Execution Unit 370 as specified by program instructions to produce tap data. The tap data is stored in the Register File 350 and is output by Instruction Dispatcher 340, with one or more filter unit opcodes, to Filter Unit 430. Steps 774 and 776 proceed as described with respect to steps 574 and 576 in conjunction with FIG. 5B.

Figure 8A:
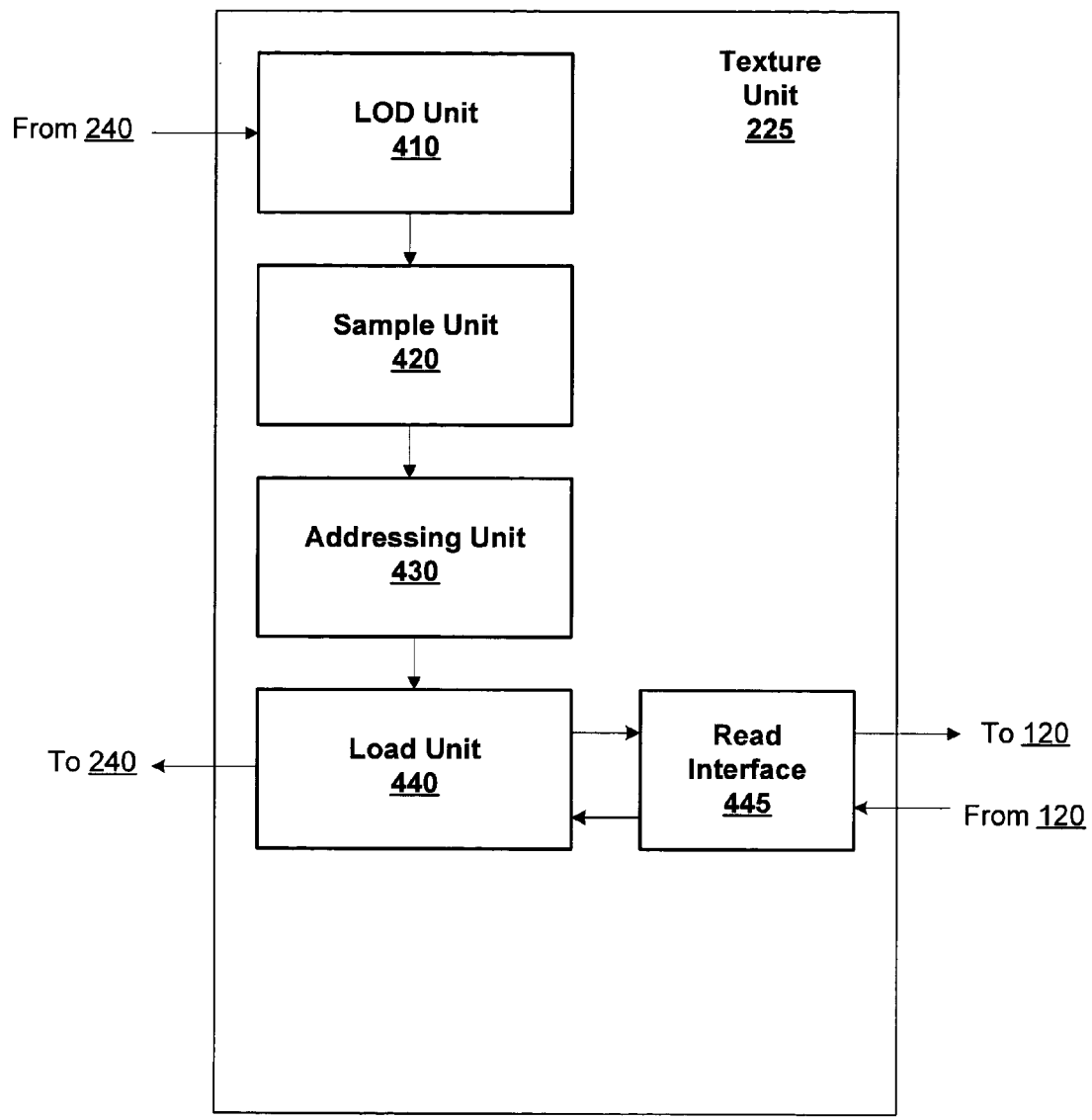
FIG. 8A is a block diagram of an exemplary embodiment of the Texture Unit of FIG. 2 in accordance with one or more aspects of the present invention.

FIG. 8A is a block diagram of an exemplary embodiment of Texture Unit 225 in accordance with one or more aspects of the present invention. Filter Unit 440 is omitted and processed graphics data is produced by Execution Unit 370 and stored in Register File 350. In one embodiment, Execution Unit 370 filters the tap data using a higher-order filter than may be processed using filter unit opcodes. In another embodiment, Execution Unit 370 performs low-precision floating-point operations on large quantities of tap data, for example, to perform block difference comparisons used in a motion compensation algorithm. A Texture Unit 225 as shown in FIG. 4A configured such that LOD Unit 410 receives graphics data and opcodes from an Execution Pipeline 240, Mux 405 outputs LOD data and opcodes to Sample Unit 420, Mux 415 outputs texture parameters and opcodes to Addressing Unit 430, Mux 425 outputs address data and opcodes to Load Unit 440, and Load Unit 440 outputs tap data to the Execution Pipeline 240, may be used as an alternate embodiment.

Figure 8B:
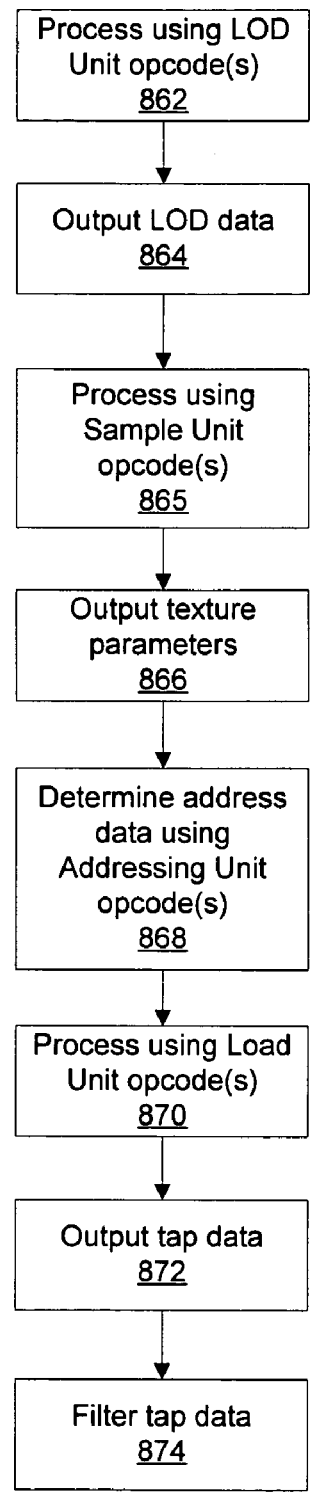
FIG. 8B illustrates an embodiment of a method of processing graphics data in accordance with one or more aspects of the present invention.

FIG. 8B illustrates an embodiment of a method of processing graphics data in accordance with one or more aspects of the present invention. Although the method steps are described in the context of the systems illustrated in FIGS. 2, 3, 4A, 5A, 6A, 7A, and 8A, any system configured to perform the method steps in any order is within the scope of the invention. Steps 862 and 864 are completed as described with respect to steps 662 and 664 in conjunction with FIG. 6B. Steps 864, 866, 868, 870, and 872 are completed as described with respect to steps 564, 566, 568, 570, and 572 in conjunction with FIG. 5B. In step 874 tap data is read from Register File 350 and processed by an Execution Unit 370 as specified by program instructions to produce processed graphics data. The processed graphics data is stored in the Register File 350 and may be further processed by Execution Unit 370 to produce fragment data. Alternatively, the processed graphics data may be output by Execution Unit 370 to Pixel Output Buffer 270 or Vertex Output Buffer 260.

Figure 8C:
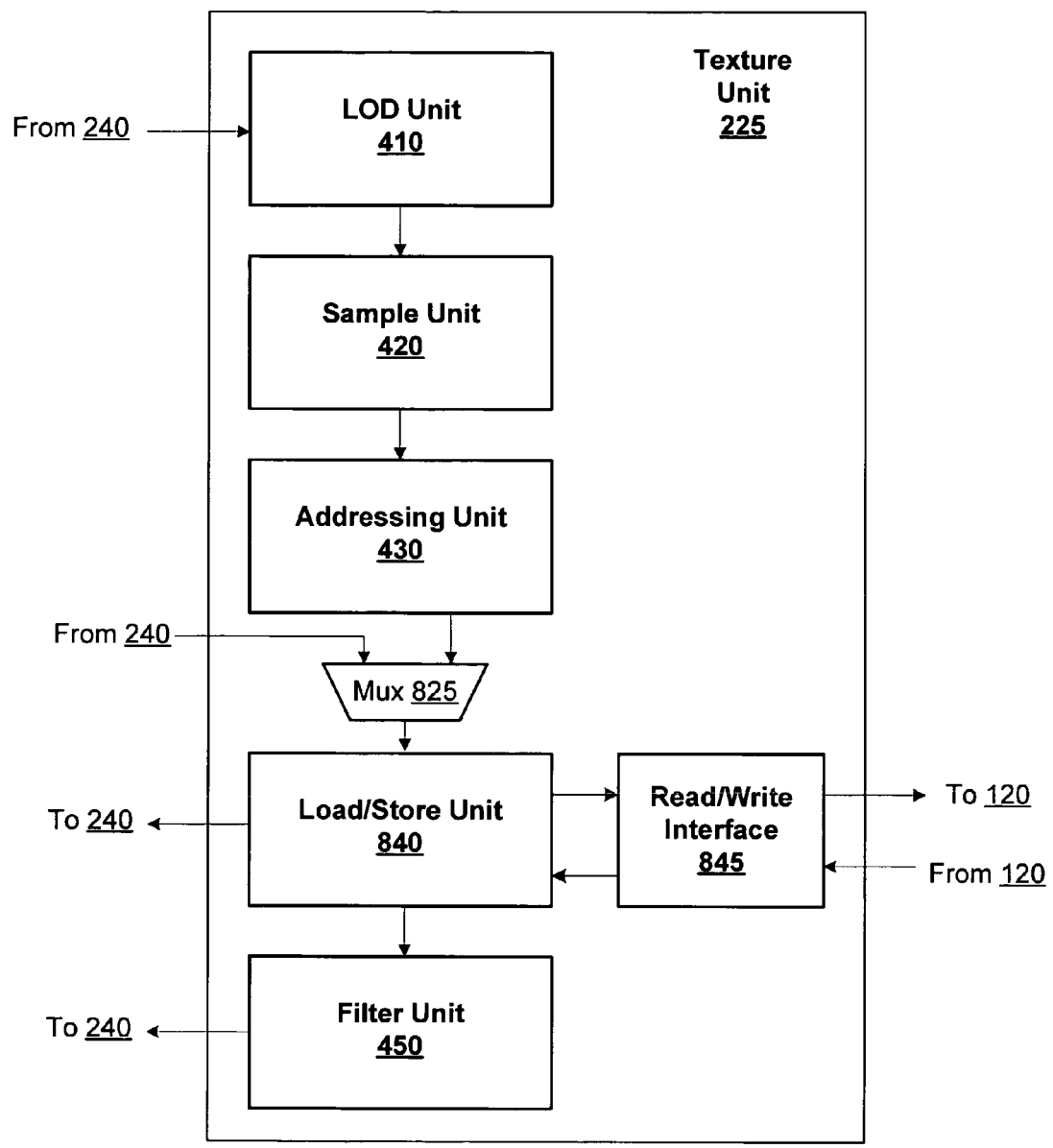
FIG. 8C is a block diagram of an exemplary embodiment of the Texture Unit of FIG. 2 in accordance with one or more aspects of the present invention.

FIG. 8C is a block diagram of an exemplary embodiment of Texture Unit 225 in accordance with one or more aspects of the present invention. In this embodiment of Texture Unit 225, Read Interface 445 is replaced with a Read/Write Interface 845. Likewise, Load Unit 440 is replaced with Load/Store Unit 840 which may read data from memory and write data to memory. A multiplexer, Mux 825 provides Load/Store Unit 840 with load/store unit opcodes and address data directly from Execution Pipelines 240 or from Addressing Unit 430. The load/store unit opcodes may include opcodes which specify storing data in memory. In an alternate embodiment the Mux 825 or its functional equivalent is included within Load/Store Unit 840.

Figure 8D:
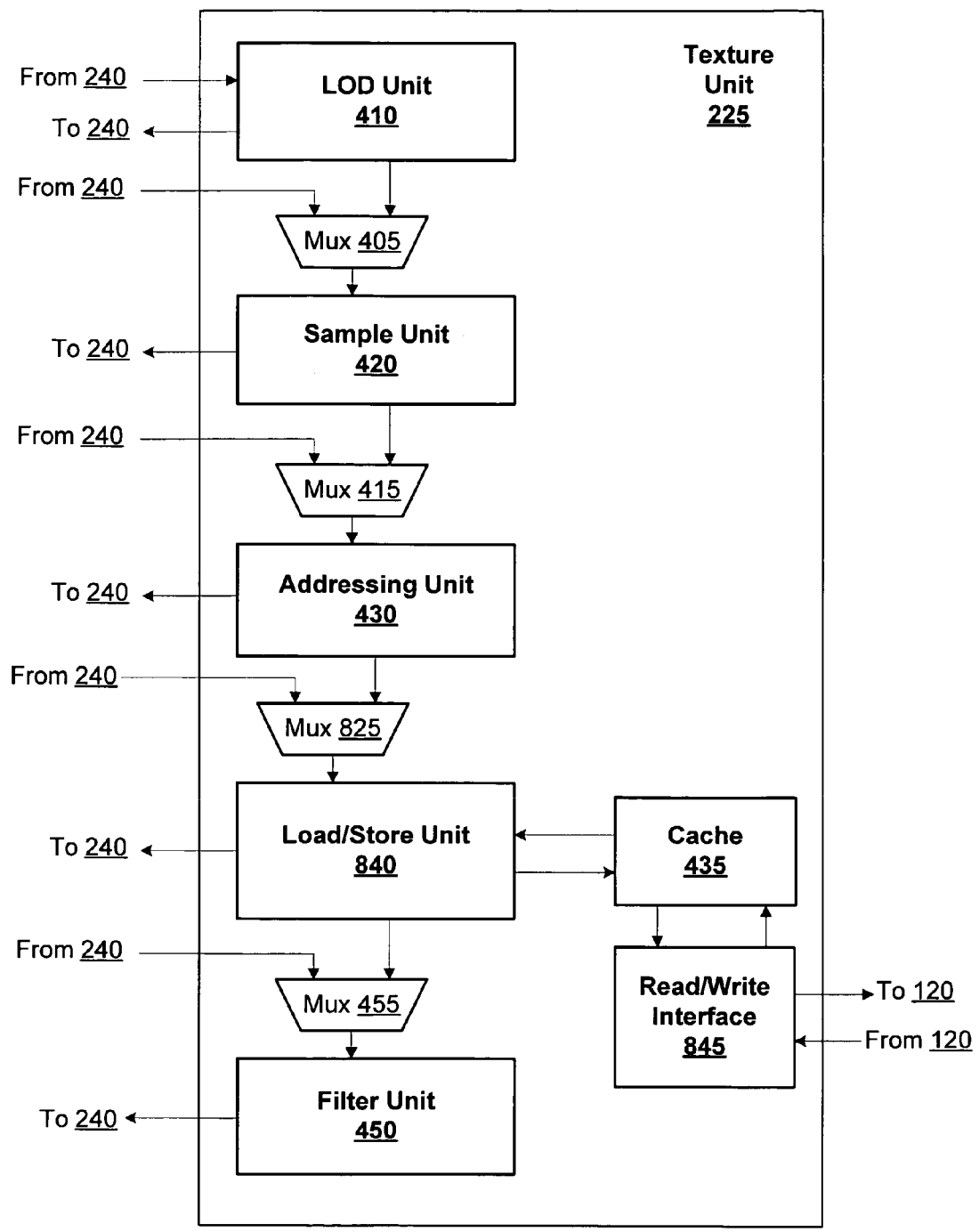
FIG. 8D is a block diagram of an exemplary embodiment of the Texture Unit of FIG. 2 in accordance with one or more aspects of the present invention.

FIG. 8D is a block diagram of an exemplary embodiment of Texture Unit 225 in accordance with one or more aspects of the present invention, including the sub-units and multiplexers shown in FIG. 4A. In this embodiment of Texture Unit 225, Read Interface 445 is replaced with a Read/Write Interface 845. Likewise, Load Unit 440 is replaced with Load/Store Unit 840 which may read data from memory and write data to memory. Mux 825 provides Load/Store Unit 840 with load/store unit opcodes and address data directly from Execution Pipelines 240. The load/store unit opcodes may include opcodes which specify storing data in memory. In an alternate embodiment the functional equivalent of each multiplexer is included within each sub-unit.

Texture Unit 225 as shown in FIG. 8D may be configured to perform the methods described in conjunction with FIGS. 4B, 5B, 6B, 7B, and 8B. Each sub-unit may be configured using opcodes specific to the sub-unit to receive data from an Execution Pipeline 240, process the data to produce processed data, and output the processed data to the Execution Pipeline 240 or another sub-unit. For example, two or more sub-units may be configured in a pipeline to process data received from an Execution Pipeline 240 while another sub-unit is configured to process data as a stand-alone unit, receiving data from an Execution Pipeline 240 and outputting processed data to the Execution Pipeline 240. The sub-units in Texture Unit 255 may be configured using sub-unit specific opcodes to offload processing from Execution Pipeline 240. The sub-units in Texture Unit 255 may also be configured using the sub-unit specific opcodes to offload processing to Execution Pipeline 240. Therefore, texture operations better utilize processing units within Texture Unit 225 and Execution Pipelines 240, resulting in greater flexibility to balance processing between Texture Unit 225 and Execution Pipelines 240 to improve performance.

Figure 9A:
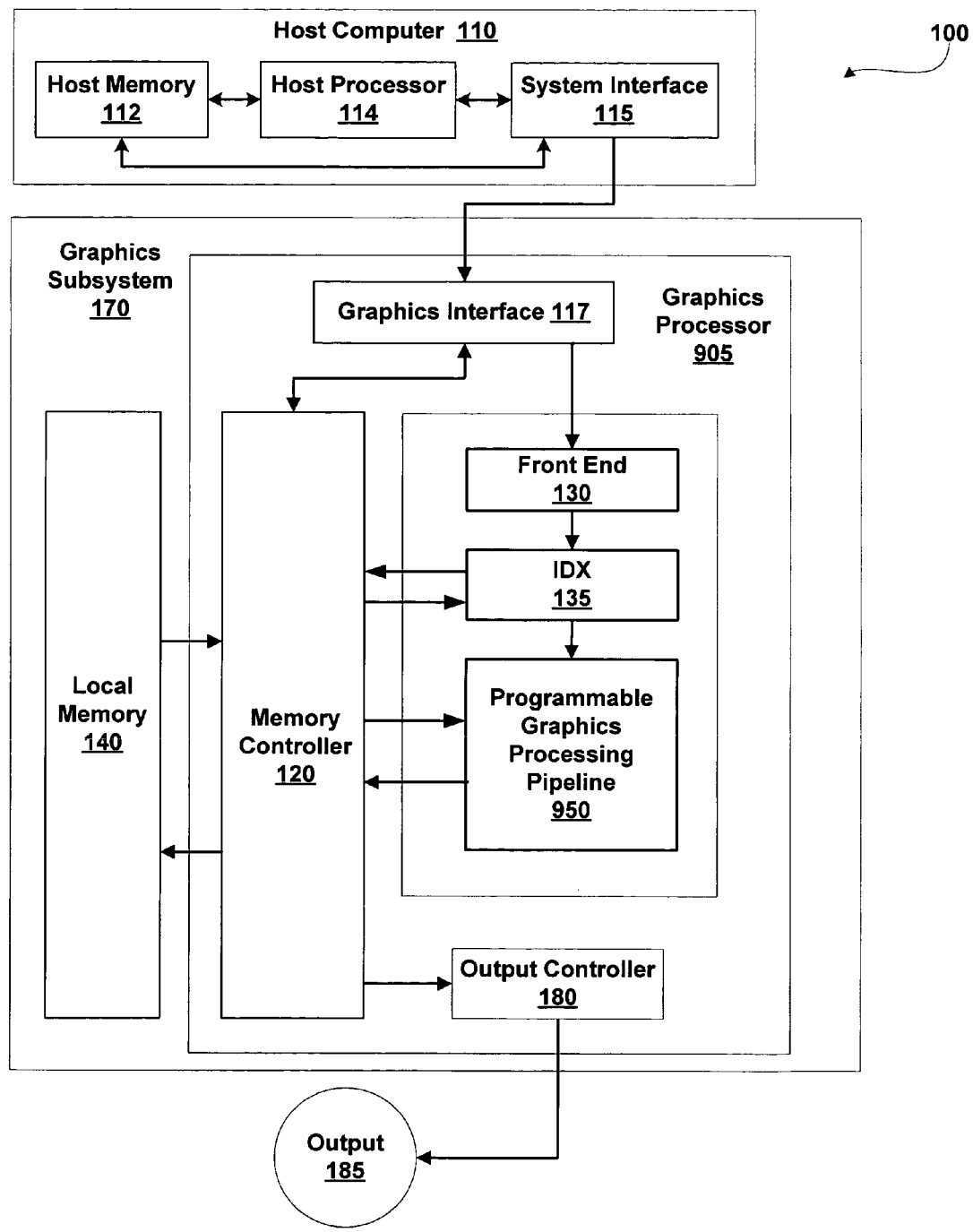
FIG. 9A is a block diagram of an exemplary embodiment of a respective computer system in accordance with one or more aspects of the present invention including a host computer and a graphics subsystem.

FIG. 9A is a block diagram of an exemplary embodiment of a Computing System 100 in accordance with one or more aspects of the present invention. In contrast to Graphics Processor 105 shown in FIG. 1, Raster Operation Unit 160 is omitted from a Graphics Processor 905. When Texture Unit 225 includes Load/Store Unit 840, execution pipelines within a Programmable Graphics Processing Pipeline 950 may be configured to perform near and far plane clipping and raster operations, such as stencil, z test, and the like. Results or samples output by Programmable Graphics Processing Pipeline 950 are saved in an output buffer stored in Local Memory 140 via Load/Store Unit 840. When the data received by Graphics Subsystem 170 has been completely processed by Graphics Processor 905, Output Controller 180 reads the output buffer to provide an Output 185 of Graphics Subsystem 170. Therefore, Raster Operation Unit 160 may be omitted from Graphics Processor 105. For example, a program may include program instructions for performing depth testing, including writing pixel data to the frame buffer via Load/Store Unit 840.

Figure 9B:
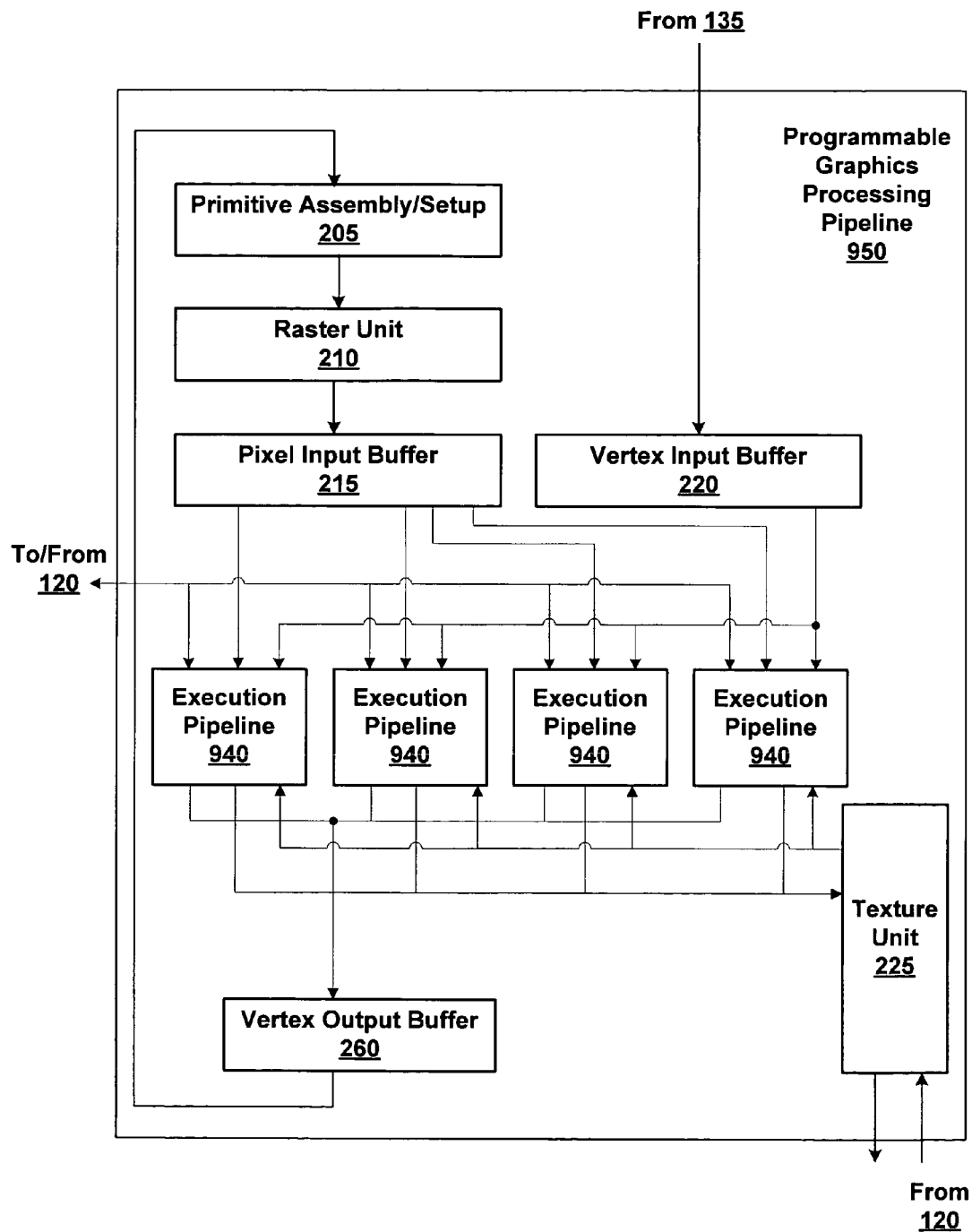
FIG. 9B is a block diagram of an exemplary embodiment of the Programmable Graphics Processing Pipeline of FIG. 9A in accordance with one or more aspects of the present invention.

FIG. 9B is a block diagram of an exemplary embodiment of Programmable Graphics Processing Pipeline 950 of FIG. 9A, including Execution Pipelines 940, in accordance with one or more aspects of the present invention. In contrast to Programmable Graphics Processing Pipeline 150 shown in FIG. 2, Pixel Output Buffer 270 is omitted. When Load/Store Unit 840 is included within Texture Unit 225, pixel data output by each Execution Pipeline 940 may be written to an output buffer via Load/Store Unit 840.

Using specific opcodes for execution by fixed function units allows greater flexibility in the processing of graphics data because the graphics data may be processed by any combination of the fixed function units. Furthermore, fixed function units may be omitted in one or more embodiments and the operations performed by the omitted fixed function units may be performed by a programmable graphics data processing unit, such as Execution Pipeline 240 or Execution Pipeline 940. Alternatively, one or more fixed function units may be used to offload the programmable graphics data processing unit, thereby reducing the occurrence of bottlenecks and improving processing performance.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

What is claimed is:

1. A graphics processor for processing graphics data, comprising:
    a texture unit, including a load unit configured to receive address data, read data corresponding to a region from memory, and produce processed graphics data; and
    a programmable execution pipeline coupled to the texture unit, the programmable execution pipeline including at least one multithreaded processing unit configured to process the graphics data and the processed graphics data, the texture unit further including a filter unit configured to receive tap data from the at least one multithreaded processing unit and to produce the processed graphics data.

2. The graphics processor of claim 1, wherein the at least one multithreaded processing unit includes a storage resource.

3. The graphics processor of claim 2, wherein the storage resource is configured to store the processed graphics data.

4. The graphics processor of claim 1, wherein the tap data is received by the filter unit from the load unit.

5. The graphics processor of claim 1, wherein the texture unit further includes a sampler unit configured to receive LOD data and produce texture parameters.

6. The graphics processor of claim 1, wherein the texture unit further includes an LOD unit configured to receive data from the at least one multithreaded processing unit and produce LOD data.

7. The graphics processor of claim 1, wherein the load unit is configured to store data in memory.

8. A system for processing graphics data using a texture unit and a programmable execution pipeline:
    the programmable execution pipeline being configured to provide graphics data to sub-units within the texture unit;
    the sub-units within the texture unit being configured to process the graphics data; and
    the sub-units within the texture unit being further configured to output processed graphics data to either the programmable execution pipeline or another of the sub-units within the texture unit, each of the sub-units being separately configured by opcodes received from the programmable execution pipeline, so that texture operations may be performed in either the sub-units of the texture unit or the execution pipeline to improve texture unit performance.

9. The system of claim 8, further comprising a multiplex unit for loading data from memory and opcodes from the execution pipeline into one of the sub-units within the texture unit.

10. The system of claim 8, wherein at least one of the sub-units stores the processed graphics data in memory via the execution pipeline.

11. A graphics processor as claimed in claim 5, wherein the sampler unit is configured by opcodes received from the programmable execution pipeline to receive LOD data and produce texture parameters.

12. A graphics processor as claimed in claim 6, wherein the LOD unit is configured by opcodes received from the programmable execution pipeline to produce the LOD data.

13. A graphics processor as claimed in claim 1, wherein the filter unit is configured by opcodes received from the execution pipeline to digitally filter the tap data and produce the processed graphics data.

14. A graphics processor as claimed in claim 13, wherein the filter unit is further configured to compute a weight for each of the taps.

15. A graphics processor as claimed in claim 14, wherein the filter tap data is represented in a floating point format and processed using floating point operations to produce processed graphics data represented in a floating point format.

16. The system of claim 8, wherein the execution pipeline includes at least one multithreaded processing unit.

17. The graphics processor of claim 16, wherein the texture unit further includes an LOD unit configured to receive data from the at least one multithreaded processing unit and produce LOD data.

18. The graphics processor of claim 17, wherein the texture unit further includes a sampler unit configured to receive LOD data and produce texture parameters.

19. A graphics processor for processing graphics data, comprising:
- a programmable execution pipeline coupled to the texture unit, the programmable execution pipeline including at least one multithreaded processing unit configured to process the graphics data and the processed graphics data;
- a texture unit, including a load unit configured to receive address data, read data corresponding to a region from memory, and produce processed graphics data;
- a sampler unit configured by opcodes to receive LOD data and produce texture parameters, and an LOD unit configured to receive data from the at least one multi-threaded processing unit and produce LOD data; and
- a filter unit configured by opcodes to receive data from the load unit and output graphics data.

20. A graphics processor as claimed in claim 19, wherein operations performed by any one or more of the sub-units including the load unit, the filter unit, the sampler unit, and the LOD unit all included in the texture unit may be performed in the execution pipeline which is coupled to the texture unit rather than in the sub-unit itself.

* * * * *